US009759872B1

(12) United States Patent
Schumacher et al.

(10) Patent No.: US 9,759,872 B1
(45) Date of Patent: Sep. 12, 2017

(54) OPTICAL FIBER POLISHING FIXTURE

(71) Applicant: Domaille Engineering, LLC, Rochester, MN (US)

(72) Inventors: Gregory A. Schumacher, Plainview, MN (US); Jill B. Christie, St. Charles, MN (US); Timothy E. Kanne, Rochester, MN (US)

(73) Assignee: Domaille Engineering, LLC, Rochester, MN (US)

( * ) Notice: Subject to any disclaimer, the term of this patent is extended or adjusted under 35 U.S.C. 154(b) by 0 days.

(21) Appl. No.: 15/047,837

(22) Filed: Feb. 19, 2016

(51) Int. Cl.
*B24B 13/00* (2006.01)
*G02B 6/38* (2006.01)

(52) U.S. Cl.
CPC ......... *G02B 6/3863* (2013.01); *G02B 6/3898* (2013.01)

(58) Field of Classification Search
CPC .. G02B 6/3863; G02B 6/3898; B24B 13/005; B24B 13/0057; B24B 41/06; B24B 41/0061; B24B 9/146
USPC ........................................................ 451/384
See application file for complete search history.

(56) References Cited

U.S. PATENT DOCUMENTS

| | | | | |
|---|---|---|---|---|
| 4,693,035 A * | 9/1987 | Doyle | ................... | B24B 19/226 451/278 |
| 4,819,386 A * | 4/1989 | Struyf | ................... | B24B 19/226 269/287 |
| 5,018,316 A * | 5/1991 | Mulholland | .......... | B24B 19/226 451/364 |
| 5,185,966 A * | 2/1993 | Mock, Jr. | .............. | B24B 19/226 451/271 |
| 5,201,148 A * | 4/1993 | Rupert | ................... | B24B 19/226 451/364 |
| 5,216,846 A * | 6/1993 | Takahashi | ............. | B24B 19/226 451/278 |
| 5,321,917 A * | 6/1994 | Franklin | ............... | B24B 19/226 451/386 |
| 5,412,747 A * | 5/1995 | Matsuoka | ............. | B24B 19/226 385/139 |
| 5,547,418 A | 8/1996 | Takahashi | | |
| 5,640,475 A | 6/1997 | Takahashi | | |

(Continued)

OTHER PUBLICATIONS

Connector, 8 pages; date: known of prior to filing; Domaille Engineering, Rochester, MN.

(Continued)

*Primary Examiner* — George Nguyen
(74) *Attorney, Agent, or Firm* — Dicke, Billig & Czaja, PLLC

(57) ABSTRACT

A polishing fixture assembly comprises a fixture base, which has a ferrule aperture and a spring member, and a clamping assembly. The spring member comprises upper, middle, and lower springs. The upper spring forms a portion of a cam aperture. The middle spring is proximate the ferrule aperture. The clamping assembly has a clamp base, a lever, and a cam shaft. The clamp base is connected to the fixture base. The lever is pivotally connected to the clamp base and has unlocked and locked positions. The cam shaft is connected to the lever and rotates within the cam aperture when the lever pivots. As the lever is moved into the locked position, the cam shaft rotates, opposing narrower sides of the cam shaft contact the upper spring thereby flexing the middle spring and the lower spring so that the middle spring contacts a ferrule positioned in the ferrule aperture.

19 Claims, 16 Drawing Sheets

(56) References Cited

U.S. PATENT DOCUMENTS

| | | | |
|---|---|---|---|
| 5,643,064 A | | 7/1997 | Grinderslev |
| 5,702,293 A | * | 12/1997 | Barth .................. B24B 13/005 451/285 |
| 5,711,701 A | | 1/1998 | Grinderslev et al. |
| 5,720,653 A | * | 2/1998 | Miller .................. B24B 19/226 451/278 |
| 5,769,698 A | * | 6/1998 | Chudoba .............. B24B 19/226 269/287 |
| 5,863,242 A | * | 1/1999 | Waldron .............. B24B 19/226 451/364 |
| 6,039,630 A | * | 3/2000 | Chandler ............. B24B 19/226 451/278 |
| D474,212 S | | 5/2003 | Domaille et al. |
| 6,718,111 B1 | * | 4/2004 | Suek .................... B24B 19/226 385/137 |
| 6,808,444 B1 | * | 10/2004 | Kuprin ................. B24B 19/226 451/292 |
| 6,979,255 B2 | * | 12/2005 | Yamada ............... B24B 19/226 269/287 |
| 7,494,402 B2 | * | 2/2009 | Yamada ............... B24B 19/226 451/270 |
| 7,738,760 B2 | | 6/2010 | Fredrickson et al. |
| D650,817 S | | 12/2011 | Schumacher |
| 8,708,776 B1 | | 4/2014 | Frazer |
| 2004/0161219 A1 | | 8/2004 | Suek et al. |

OTHER PUBLICATIONS

Connector, 2 pages; date: known of prior to filing; Domaille Engineering, Rochester, MN.
AbraSave® MT-EZ Fixture Line, 2 pages; date: known of prior to filing; Domaille Engineering, Rochester, MN.
MTP/MPO Connector, 1 page; date: known of prior to filing; Domaille Engineering, Rochester, MN.
MTRJ Connector, 1 page; date: known of prior to filing; Domaille Engineering, Rochester, MN.
AbraSave™ High vol. Fixtures, 2 pages; date: known of prior to filing; Domaille Engineering, Rochester, MN.
AbraSave® Ferrule Only Connector, 1 page; date: known of prior to filing; Domaille Engineering, Rochester, MN.
Ferrule Only Connector, 1 page date: known of prior to filing; Domaille Engineering, Rochester, MN.
Ferrule Only Connector E2000, 1 page; date: known of prior to filing; Domaille Engineering, Rochester, MN.
Connector -DCW-840-12, S/N 9872, 1 page; date: known of prior to filing; Domaille Engineering, Rochester, MN.
Connector SFA-DCD25635124-6, S/N. 9430, 1 page date: known of prior to filing; Domaille Engineering, Rochester, MN.
"About Our Polishing Fixtures," http://wwwdomailleengineering.com/optical-fiber-polishing/polishing-fixtures.php, 1 page; May 17, 2016.
"AbraSave® Advantages," http://www.domailleengineering.com/abrasave/abrasave-advantages.php, 1 page; May 17, 2016.
"AbraSave® Fixtures," http://www.domailleengineering.com/optical-fiber-polishing/polishing-fixtures/abrasave-fixtures.php, 1 page; May 17, 2016.
Domaille Engineering, "Technology for Tomorrow," Fixture Product Book, 8 pages, 2014.
Senko Group® Polishing Accessories, http://www.senko.com/fiberoptic/download_pdf.php?product=120 (2015) (1 Page).
Senko Group® MT Polishing Fixture, http://www.senko.com/literature/24-Position-MPO-%20Fixture-Handout.pdf (2015) (2 Pages).

* cited by examiner

OPTICAL FIBER POLISHING FIXTURE

BACKGROUND OF THE INVENTION

A fiber optic cable generally includes a protective or supporting material through which an optical fiber extends. The cables typically have connectors located on each end to connect them to other fiber optic cables or to peripheral devices, and the connectors are high precision devices that position the fibers in the cables for optimal connection.

In order to pass light signals thru fiber optic cables, the end face of the connector (from which a ferrule and an optical fiber extend) must abut an adjacent cable connector in a specific manner. The high tolerances required of the parts to make these connections lead to precise shaping of the ends via cleaving, cutting, and/or polishing. Apex offset, radius of curvature, fiber protrusion/recession, and angularity are all geometric parameters of a fiber end face that play into the quality of the signal passing thru the cable. Final test measurements for back reflection and insertion loss are typically used as the final checks to determine the quality of the geometry (as well as the alignment, cleanliness, and surface finish of the finished cable.) As such, the end face is usually polished to exacting standards so as to produce a finished product with minimal back reflection and loss. For example, it is often necessary to polish the end face of the connector to a precise length, i.e., so the end face projects a predetermined amount from a reference point such as a shoulder on the fiber optic connector within a predetermined tolerance. Fiber optic cables having multiple optical fibers can also be polished to produce a particular performance specification.

Optical fiber polishers typically include a rotating platen and an arm mechanism that positions and supports the connectors during the polishing process. Typically, the end face is lowered onto a film resting on the platen, and depending upon the film, the speed of the platen, the pressure applied, and its duration, acquires a product suitable for a particular application.

Optical fiber polishers generally include a fixture coupled to the arm mechanism that is capable of holding and gripping one or more fiber optic connectors and advancing them under controlled conditions of speed and force to engage a plurality of fiber optic ends into engagement with a polishing member such as a rotatable platen having an abrasive surface. In order to achieve the precision typically needed, the fiber optic connectors must be secured within the fixture in such a way that all the connectors protrude from the bottom of the fixture at the same angle and to the same extent, thus assuring that each optical fiber is polished at the same degree and extent.

As such, fixtures typically employ complex clamping assemblies that are used to hold the connectors at the desired angle and depth. These clamping assemblies can require extensive manipulation from an operator in order to load and unload the connectors from the fixture, thus increasing the time needed to polish multiple connectors. In addition, existing fixtures can present obstacles when one or more of the clamping assemblies needs replacing. For example, when even a single clamping assembly needs replacing, an operator may need to halt polishing in order to send the entire fixture back to the manufacturer for repairs.

For the reasons stated above and for other reasons stated below, which will become apparent to those skilled in the art upon reading and understanding the present specification, there is a need in the art for an improved optical fiber polishing fixture, including a spring member and a clamping assembly.

BRIEF SUMMARY OF THE INVENTION

The above-mentioned problems associated with prior devices are addressed by embodiments of the present invention and will be understood by reading and understanding the present specification. The following summary is made by way of example and not by way of limitation. It is merely provided to aid the reader in understanding some of the aspects of the invention.

In one embodiment, an optical fiber polishing fixture assembly comprises a fixture base and a clamping assembly. The fixture base has a ferrule aperture and a spring member. The spring member comprises an upper spring, a middle spring, and a lower spring. The upper spring forms at least a portion of a cam aperture. The middle spring is positioned proximate the ferrule aperture. The clamping assembly has a clamp base, a lever, and a cam shaft. The clamp base is configured and arranged to be operatively connected to the fixture base. The lever is pivotally connected to the clamp base and has an unlocked position and a locked position. The cam shaft is operatively connected to the lever and rotates when the lever pivots. The cam shaft has opposing narrower sides and opposing wider sides and is positioned within the cam aperture. As the lever is moved from the unlocked position to the locked position, the cam shaft rotates, the opposing narrower sides contact the upper spring thereby flexing the middle spring and the lower spring so that the middle spring contacts a ferrule positioned in the ferrule aperture, and movement of the spring member allows for variation in ferrule size and protects the ferrule while clamping so that clamping of the ferrule does not damage the ferrule or optical fibers extending through the ferrule.

In one embodiment, an optical fiber polishing fixture assembly comprises a fixture base and a clamping assembly. The fixture base has a ferrule aperture and a spring member. The spring member comprises an upper spring, a middle spring, and a lower spring. The upper spring forms at least a portion of a cam aperture and has a first portion that extends around a portion of the cam aperture and extends generally upward therefrom, a second portion that extends generally downward from the first portion, and a third portion that extends generally downward from the second portion proximate the first portion and is connected to the middle spring and the lower spring. The middle spring is positioned proximate the ferrule aperture and extends generally upward from the third portion. The lower spring extends generally downward from the third portion. A first lobe is positioned proximate a juncture of the first portion and the second portion, and a second lobe is positioned proximate a juncture of the third portion and the middle spring. The clamping assembly has a clamp base, a lever, and a cam shaft. The clamp base is configured and arranged to be operatively connected to the fixture base. The lever is pivotally connected to the clamp base and has an unlocked position and a locked position. The cam shaft is operatively connected to the lever and rotates when the lever pivots. The cam shaft has opposing narrower sides and opposing wider sides and is positioned within the cam aperture. As the lever is moved from the unlocked position to the locked position, the cam shaft rotates, the opposing narrower sides contact the upper spring thereby flexing the middle spring and the lower spring so that the middle spring contacts a ferrule positioned in the ferrule aperture, and movement of the spring member allows for variation in ferrule size and protects the ferrule while clamping so that clamping of the ferrule does not damage the ferrule or optical fibers extending through the ferrule.

In one embodiment, a method of connecting a ferrule to an optical fiber polishing fixture assembly comprises obtaining a fixture base to which a clamping assembly is operatively connected. The fixture base has a ferrule aperture and a spring member. The spring member comprises an upper spring, a middle spring, and a lower spring. The upper spring forms at least a portion of a cam aperture. The middle spring is positioned proximate the ferrule aperture. The clamping assembly has a clamp base, a lever, and a cam shaft. The clamp base is configured and arranged to be operatively connected to the fixture base. The lever is pivotally connected to the clamp base and has an unlocked position and a locked position. The cam shaft is operatively connected to the lever and rotates when the lever pivots. The cam shaft has opposing narrower sides and opposing wider sides, and the cam shaft is positioned within the cam aperture. The lever is positioned in the unlocked position. A ferrule operatively connected to a cable is positioned in the ferrule aperture and the lever is moved from the unlocked position to the locked position thereby causing the cam shaft to rotate so that the opposing narrower sides contact the upper spring thereby flexing the middle spring and the lower spring so that the middle spring contacts the ferrule positioned in the ferrule aperture, and movement of the spring member allows for variation in ferrule size and protects the ferrule while clamping so that clamping of the ferrule does not damage the ferrule or optical fibers extending through the ferrule.

BRIEF DESCRIPTION OF THE DRAWINGS

The present invention can be more easily understood, and further advantages and uses thereof can be more readily apparent, when considered in view of the detailed description and the following Figures in which.

In accordance with common practice, the various described features are not drawn to scale but are drawn to emphasize specific features relevant to the present invention. Reference characters denote like elements throughout the Figures and the text.

DETAILED DESCRIPTION OF THE INVENTION

In the following detailed description, reference is made to the accompanying drawings, which form a part hereof, and in which is shown by way of illustration embodiments in which the inventions may be practiced. These embodiments are described in sufficient detail to enable those skilled in the art to practice the invention, and it is to be understood that other embodiments may be utilized and mechanical changes may be made without departing from the spirit and scope of the present invention. The following detailed description is, therefore, not to be taken in a limiting sense, and the scope of the present invention is defined only by the claims and equivalents thereof.

Generally, embodiments of the present invention provide a fixture including a spring member and a clamping assembly for securing a cable assembly to a polisher.

Figure 1:
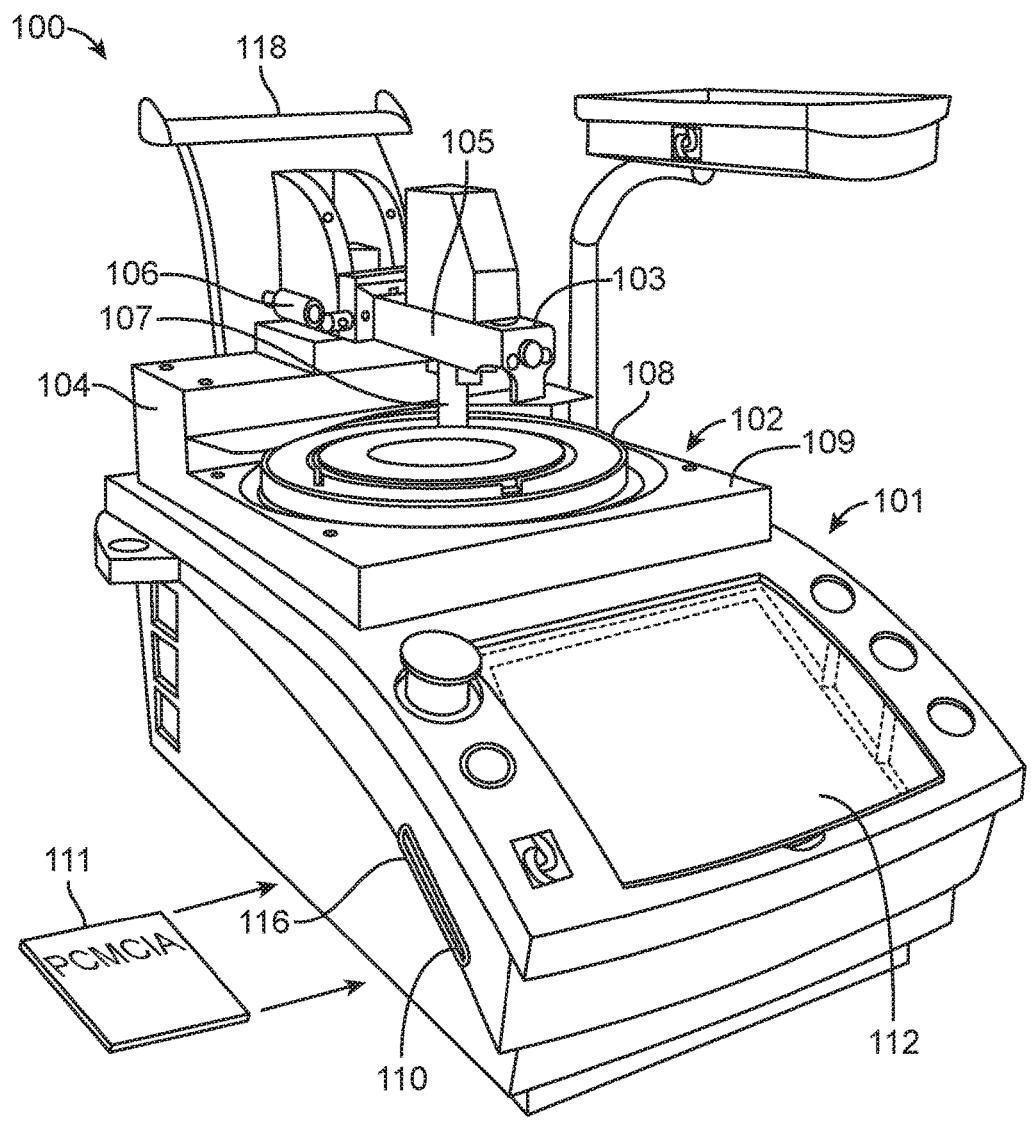
FIG. 1 is a perspective view of an optical fiber polisher constructed in accordance with the principles of the present invention.

FIG. 1 is a perspective view of an optical fiber polisher 100 constructed in accordance with the principles of the present invention. This type of optical fiber polisher 100 is shown and described in U.S. Pat. Nos. 7,738,760 and 8,708,776, which are hereby incorporated by reference, and is Optical Fiber Polishing Machine APM Model HDC-5300 by Domaille Engineering, LLC of Rochester, Minn. Although optical fiber polisher 100 is generally shown and described, it is recognized that other suitable types of polishers could be used with the present invention.

Generally, the polisher 100 includes a polishing unit 102 comprising a pneumatic overarm assembly 103, a platen assembly 108 rotatably supported by a stage 109, a processor, a porting device 110 for a portable memory device 111, and an input device 112. A housing 101 supports and aligns the polishing unit 102, the processor, and the input device 112 in an operative position. A slot 116 is inserted along one side of the housing 101 to allow the portable memory device 111 to access the porting device 110. A cable management attachment 118 is connected to the back of the housing 101 for supporting fiber optic cables undergoing a polishing process.

The pneumatic overarm assembly 103 includes an overarm 105 hingedly secured along one end to a base 104, the overarm 105 rotatable about the hinged end. A pair of pneumatic cylinders 106 is coupled to the overarm 105, opposing rotational movement thereof. A mounting pole 107 extends downward from the overarm 105 and is configured and arranged, as is well known in the art, to connect to a mounting tube 202 of a fixture 200, which is described in more detail below.

The polisher 100 maintains rigid control of each polishing process through feedback mechanisms which control the operation of both the platen assembly 108 and the pneumatic overarm assembly 103. The feedback mechanisms communicate with the processor to continuously monitor the performance of the platen assembly 108 and the pneumatic overarm assembly 103 and ensure that both are functioning at their set levels. In some embodiments, the processor communicates with the porting device 110, the input device 112, and a USB port for a keyboard to enable rapid programming of the polisher 100. The input device 112 also serves as a visual indicator of actual operating parameters.

Figure 2:
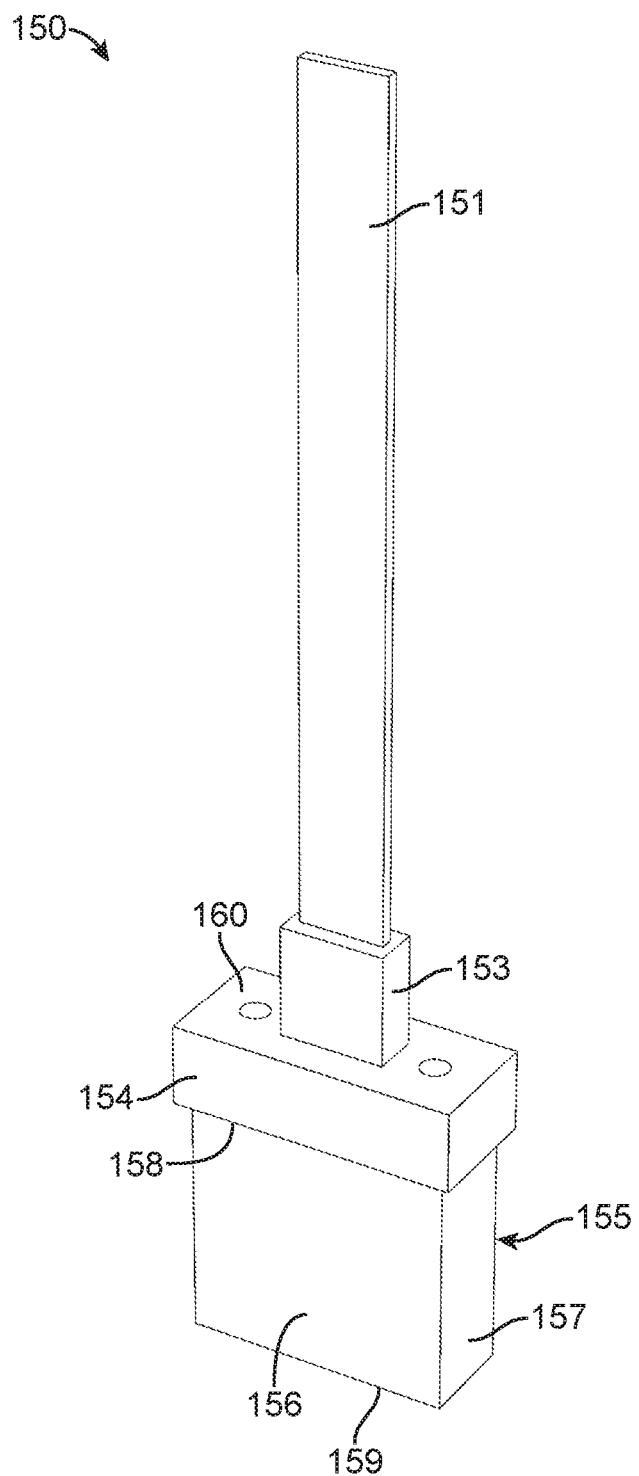
FIG. 2 is a top perspective view of a fiber optic cable assembly constructed in accordance with the principles of the present invention.
Figure 3:
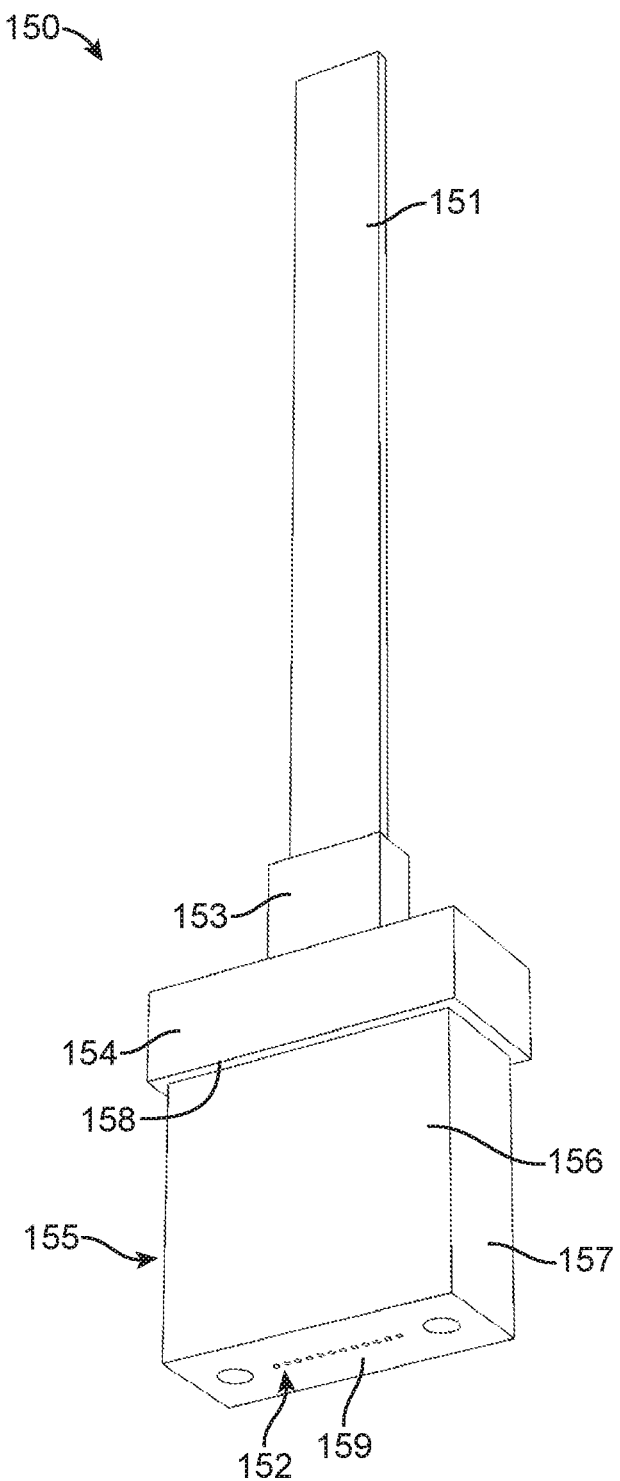
FIG. 3 is a bottom perspective view of the fiber optic cable assembly shown in FIG. 2.

FIGS. 2 and 3 are perspective views of an example fiber optic MT ferrule assembly 150, including a fiber cable 151. Although this type of assembly is shown and described, it is recognized that other suitable types of assemblies for use with any suitable non-round ferrules such as but not limited to MT ferrules, MTRJ ferrules, and fiber arrays. In some embodiments, a fixture could be adapted to receive one or more different types of assemblies. The fiber optic MT ferrule assembly 150 includes a ferrule 155 with a strain relief 153 and a fiber cable 151. The ferrule 155 has a shoulder 154, and fiber apertures 152 The fiber apertures 152 go through the ferrule 155 to allow the fiber in the fiber cable 151 to go through the ferrule and be polished coplanar to the ferrule end face 159. The shoulder 154 includes a top face 160 to which the strain relief 153 is attached. The ferrule 155 generally includes an end face 159 and four side faces 156 and 157. A shoulder bottom face 158 of the shoulder 154 is preferably manufactured substantially parallel with a ferrule end face 159 of the ferrule 155. Thus, according to some embodiments, the ferrule end face 159 may be squared within a fixture with reference to the shoulder bottom face 158.

Embodiments of the present invention provide a fixture 200 including a spring member 214 and a clamping assembly 300. In this embodiment, the fixture 200 includes a generally disk-shaped base 201 having a center portion from which a mounting tube 202 extends upward. The base could be round, rectangular, or other suitable shapes and may not include a mounting tube. The base 201 is configured and arranged to be supported by the platen assembly 108 and the mounting tube 202 is configured and arranged to receive the mounting pole 107. In one embodiment, the base 201 is made of hardened stainless steel and is preferably 0.19 to 0.21 inches thick, however, it is recognized that any suitable thickness could be used as long as it is not too thick so that the ferrule does not sufficiently protrude from the fixture or too thin so that the ferrule does not have adequate support. The thickness of the base could change depending upon the type of ferrule it is holding. The size of the different ferrules may be longer or shorter and the base would change accordingly. Preferably, the ferrule protrudes 0.020 to 0.040 inches out of the bottom of the base referred to as "ferrule protrusion". It is recognized that other suitable materials and dimensions could be used. The material is preferably hardened so that the spring member will flex and not bend.

Figure 4:
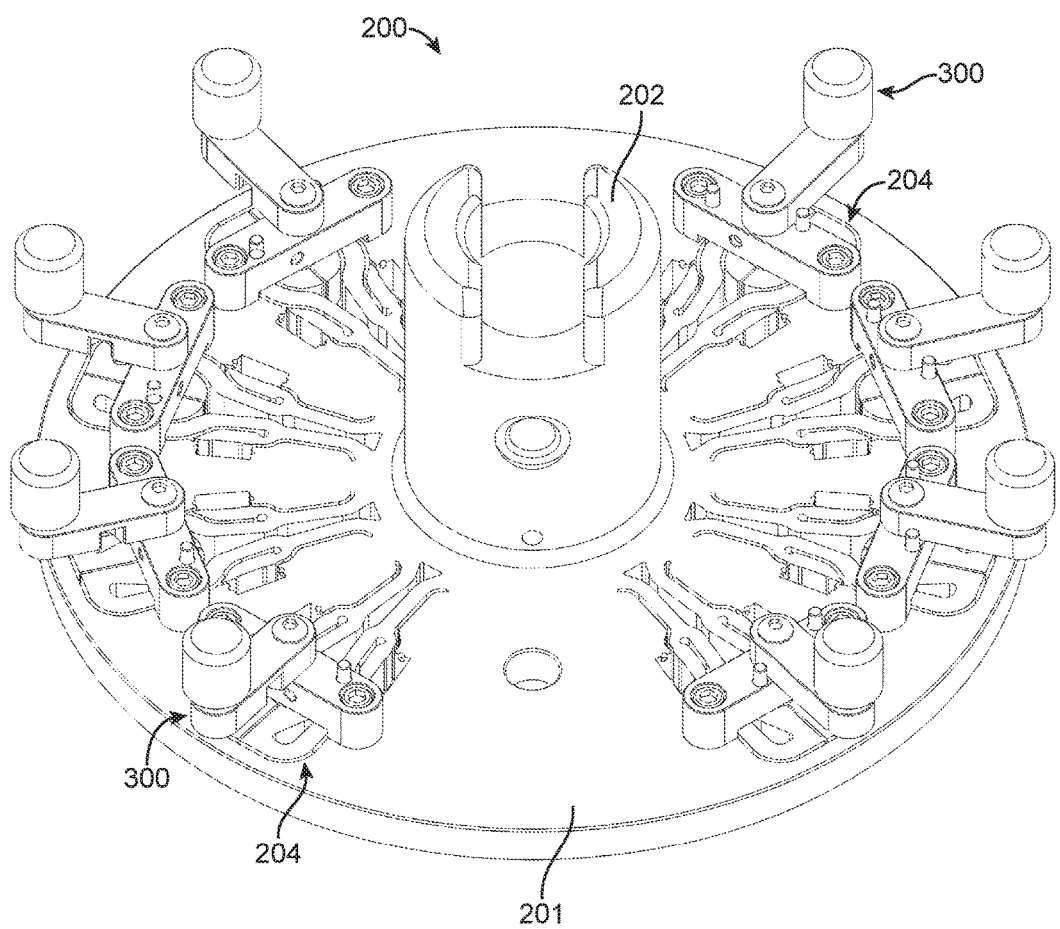
FIG. 4 is a top perspective view of a fixture including a clamping assembly constructed in accordance with the principles of the present invention.
Figure 5:
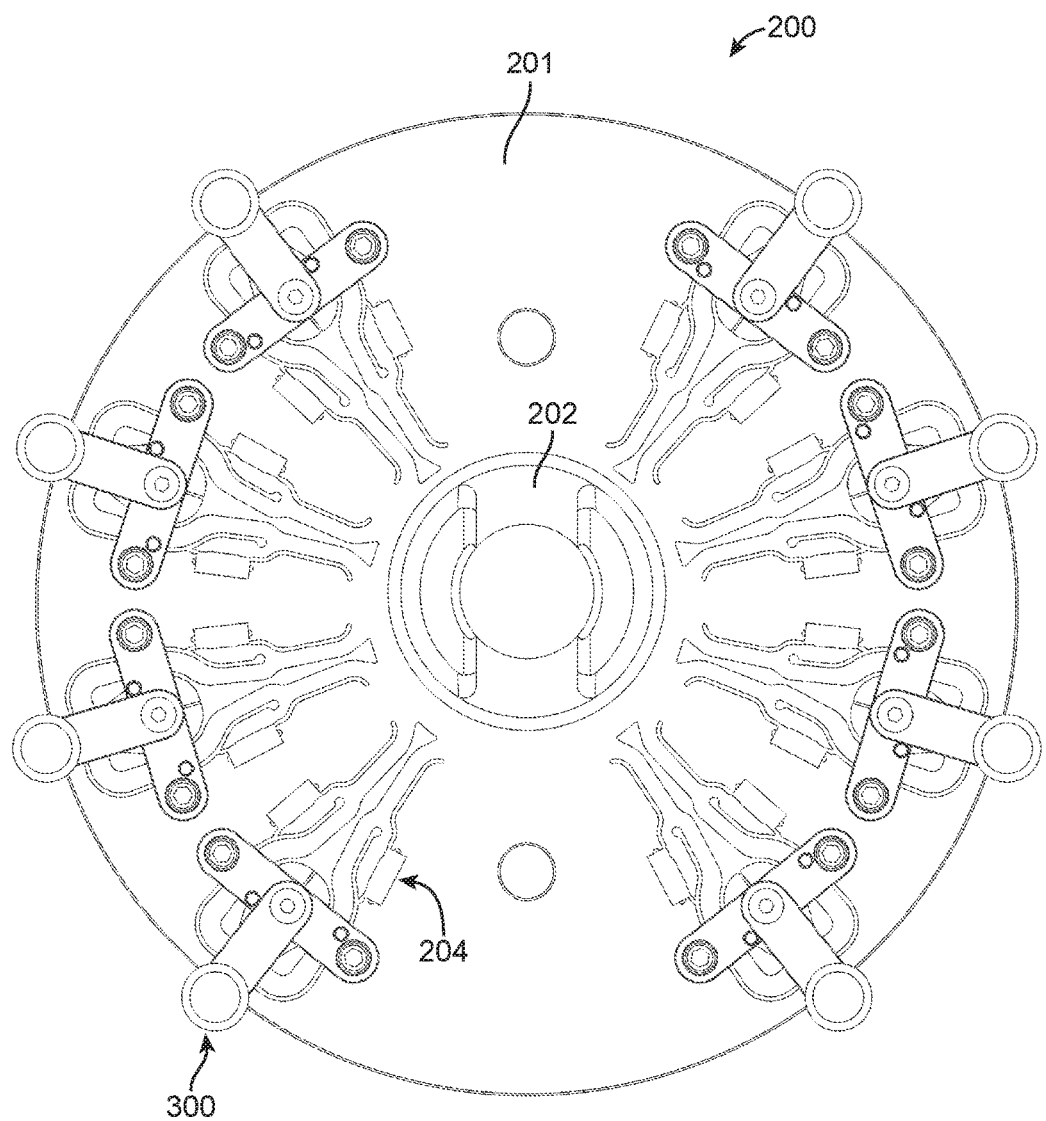
FIG. 5 is a top view of the fixture shown in FIG. 4.
Figure 6:
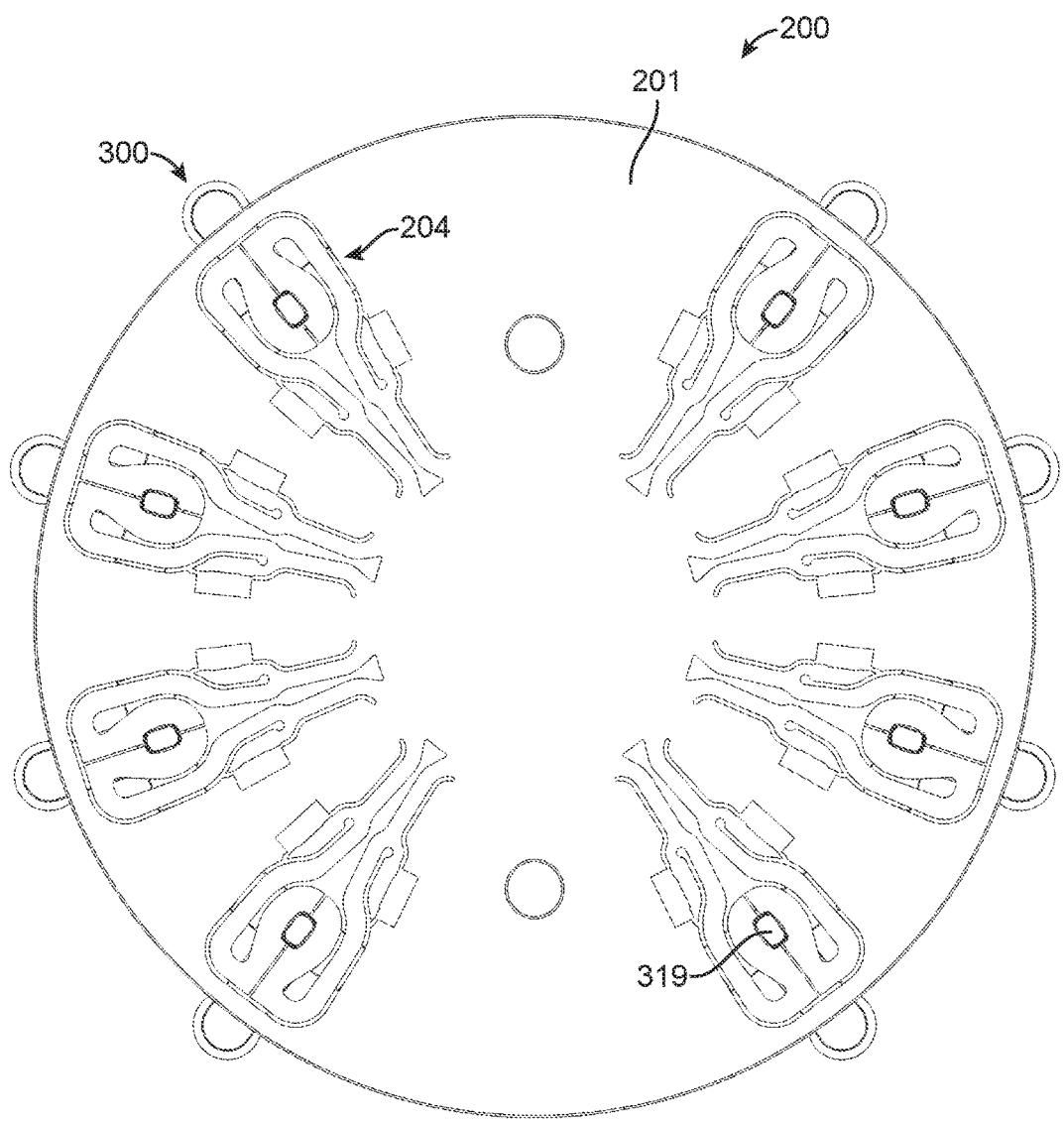
FIG. 6 is a bottom view of the fixture shown in FIG. 4.
Figure 7:
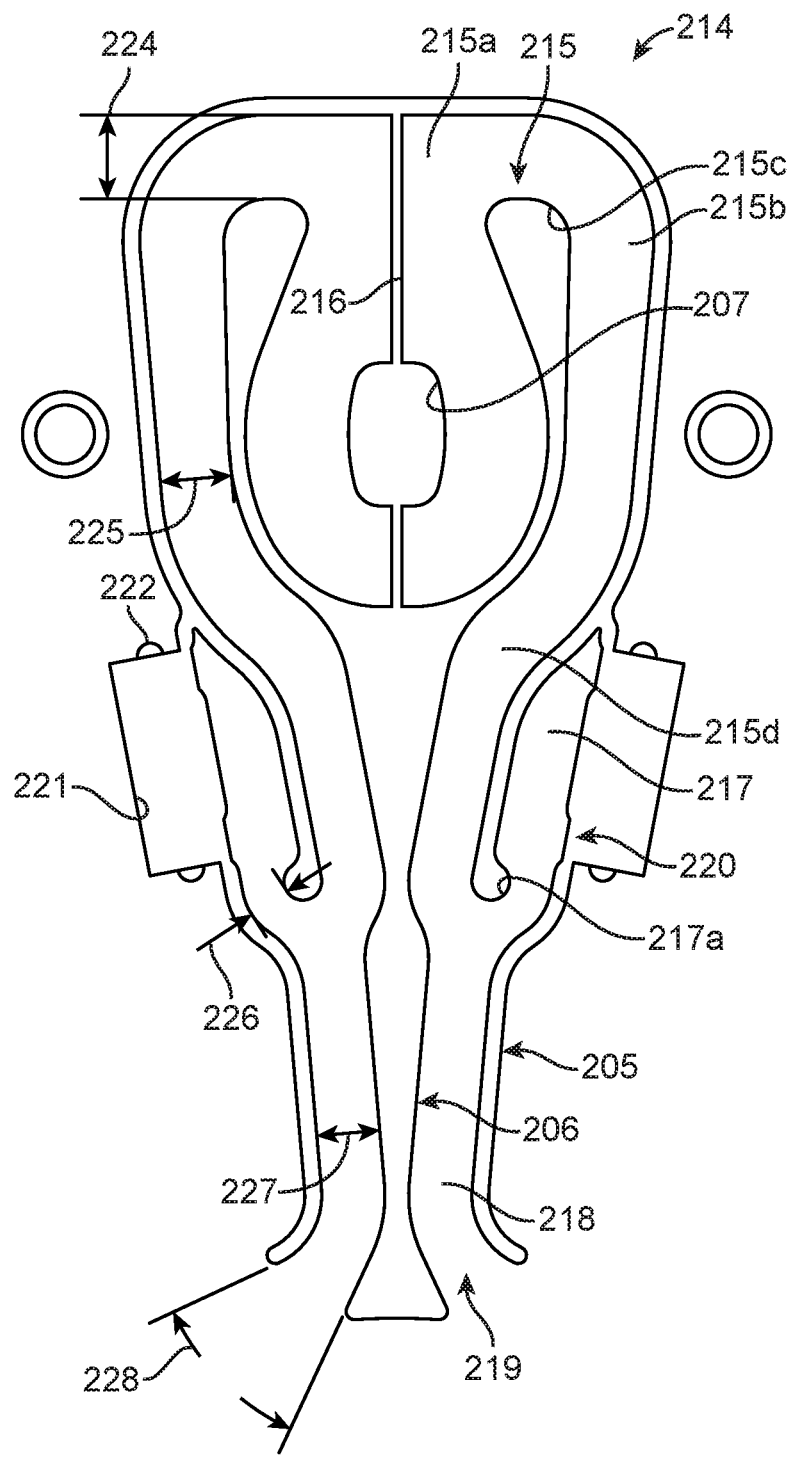
FIG. 7 is a top view of a spring member of the fixture shown in FIG. 4.

A cut pattern 204, which could include one or more cut patterns as described, extends from proximate an outer edge of the base 201 toward the center portion proximate the mounting tube 202. For example, FIGS. 4-6 show eight such cut patterns, but any desired number could be used. As shown in FIG. 7, the cut pattern 204 generally includes an outer cut portion 205, an inner cut portion 206, and a cam aperture 207 that are in fluid communication to form a spring member 214. For ease of reference, the spring member 214 is being described in the orientation shown in FIG. 7 and should not be limited to the orientation shown and described. The spring member 214 includes an upper spring portion 215, a middle spring portion 217, and a lower spring portion 218. The upper spring portion 215 includes a first portion 215a that extends around a portion of the cam aperture 207 and extends generally upward therefrom, a second portion 215b that extends generally downward from the first portion 215a, and a third portion 215d that extends generally downward from the second portion 215b proximate the distal end of the first portion 215a. The middle spring 217 extends generally upward from an outer side of the third portion 215d, the lower spring 218 extends generally downward from the third portion 215d and the middle spring 217. The third portion 215d, the middle spring 217, and the lower spring 218 generally form a Y-shaped portion proximate where they connect. The inner cut portion 206 forms a first lobe 215c proximate the juncture of the first portion 215a and the second portion 215b. The outer cut portion 205 forms a second lobe 217a proximate the juncture of the third portion 215d and the middle spring 217 and forms a ferrule aperture 221 proximate the other side of the middle spring 217. Receiving apertures 222 may be positioned on opposing ends of the ferrule aperture for clearance of flashing on the MT ferrule created during the plastic injection molding process when making them. The lower spring 218 is connected to the base 201 proximate an opening 219 formed between the outer cut portion 205 and the inner cut portion 206. There is another spring member 214, generally a mirror image, on the other side of the cam aperture 207. The cut pattern 204 could be formed by wire electrical discharge machining ("EDM") or any other suitable technique.

As shown in FIG. 7, preferably in this embodiment, a generally top portion of the first portion 215a from which the second portion 215b extends downward has a first thickness 224 of 0.100+/−0.004 inch. Preferably, the second portion 215b has a second thickness 225 of 0.085+/−0.004 inch proximate a lower portion of the cam aperture 207. Preferably, the middle spring 217 has a third thickness 226 of 0.50+/−0.004 inch proximate the second lobe 217a. Preferably, the lower spring 218 has a fourth thickness 227 of 0.075+/−0.004 inch proximate its middle. Preferably, the opposing ends of the lower spring 218 form an angle 228 of approximately 40°. Alternatively, the second thickness 225 could be 80 to 90% of the first thickness 224, the third thickness 226 could be 40 to 60% of the first thickness 224, and the fourth thickness could be 70 to 80% of the first thickness 224. It is recognized that these preferred ranges of dimensions, or alternatively percentages, may not be applicable if another material is used for the fixture, if the dimensions of the fixture are changed (e.g., the fixture is made larger), and if modifications are made to the configuration of the spring member, which are within the scope of the present invention. Thus, the spring design could be scaled larger or smaller to work with different sized ferrules.

Figure 8:
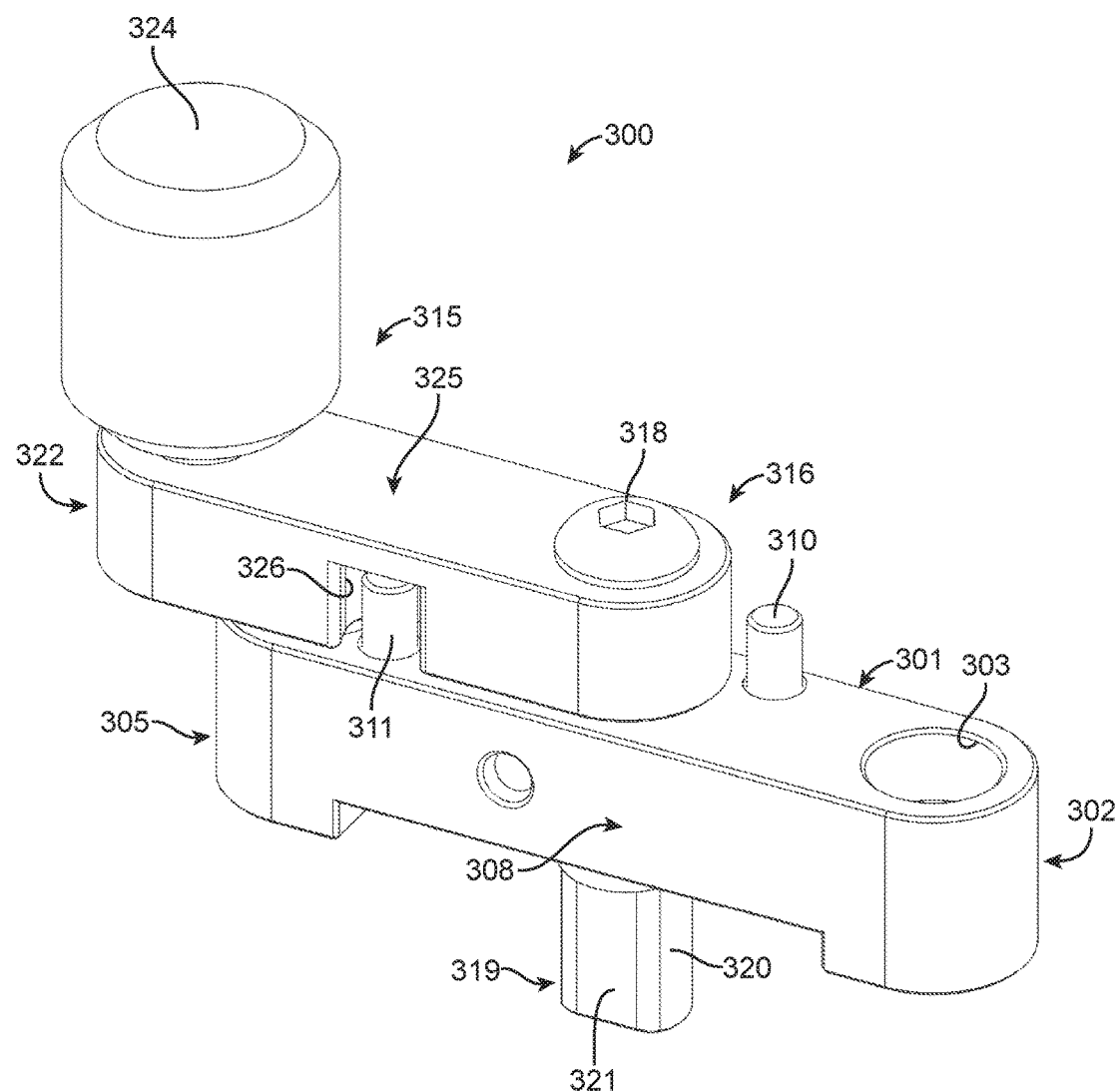
FIG. 8 is a perspective view of the clamping assembly shown in FIG. 4.
Figure 9:
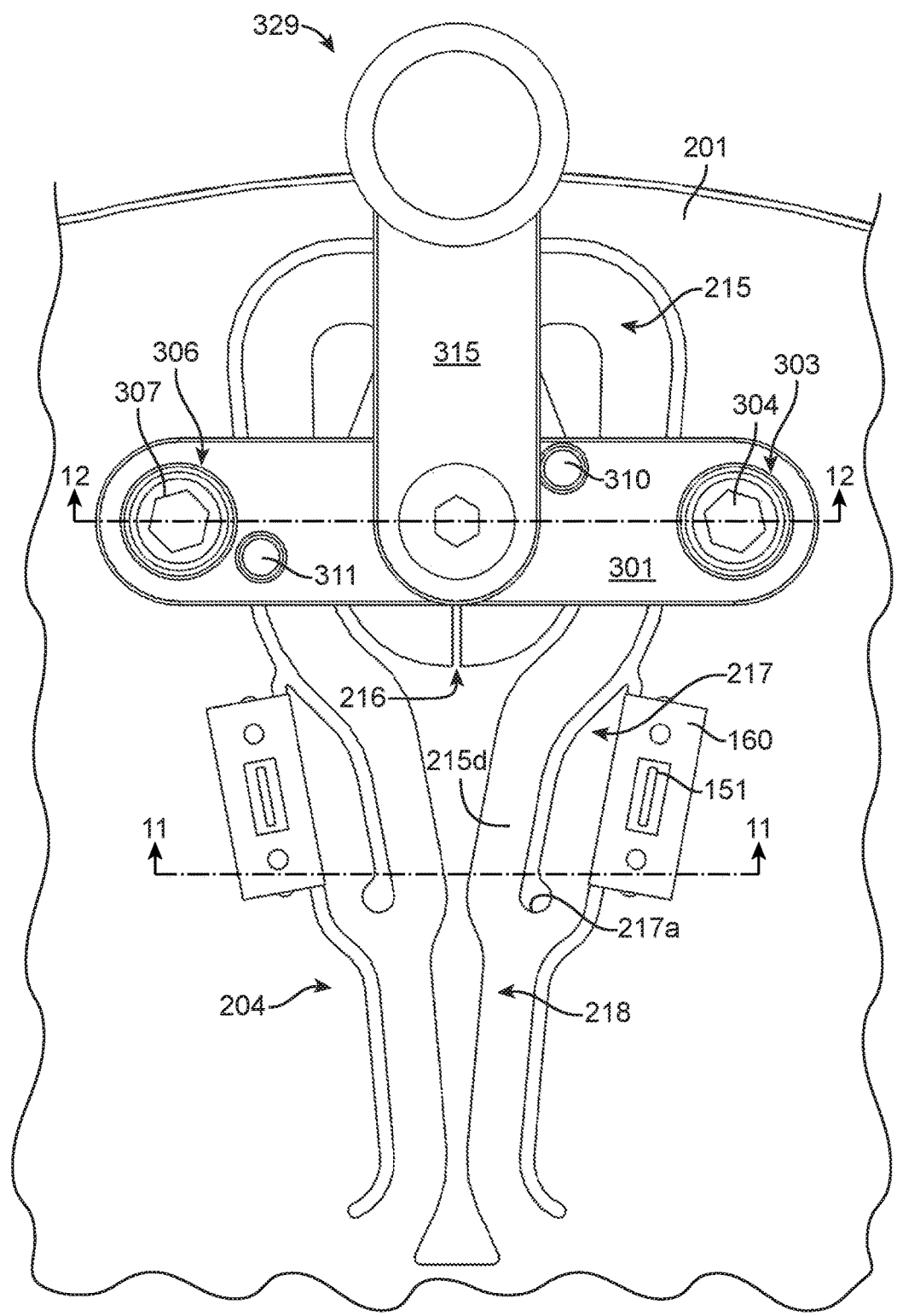
FIG. 9 is a top view of a portion of the fixture shown in FIG. 4 showing an unlocked position.
Figure 12:
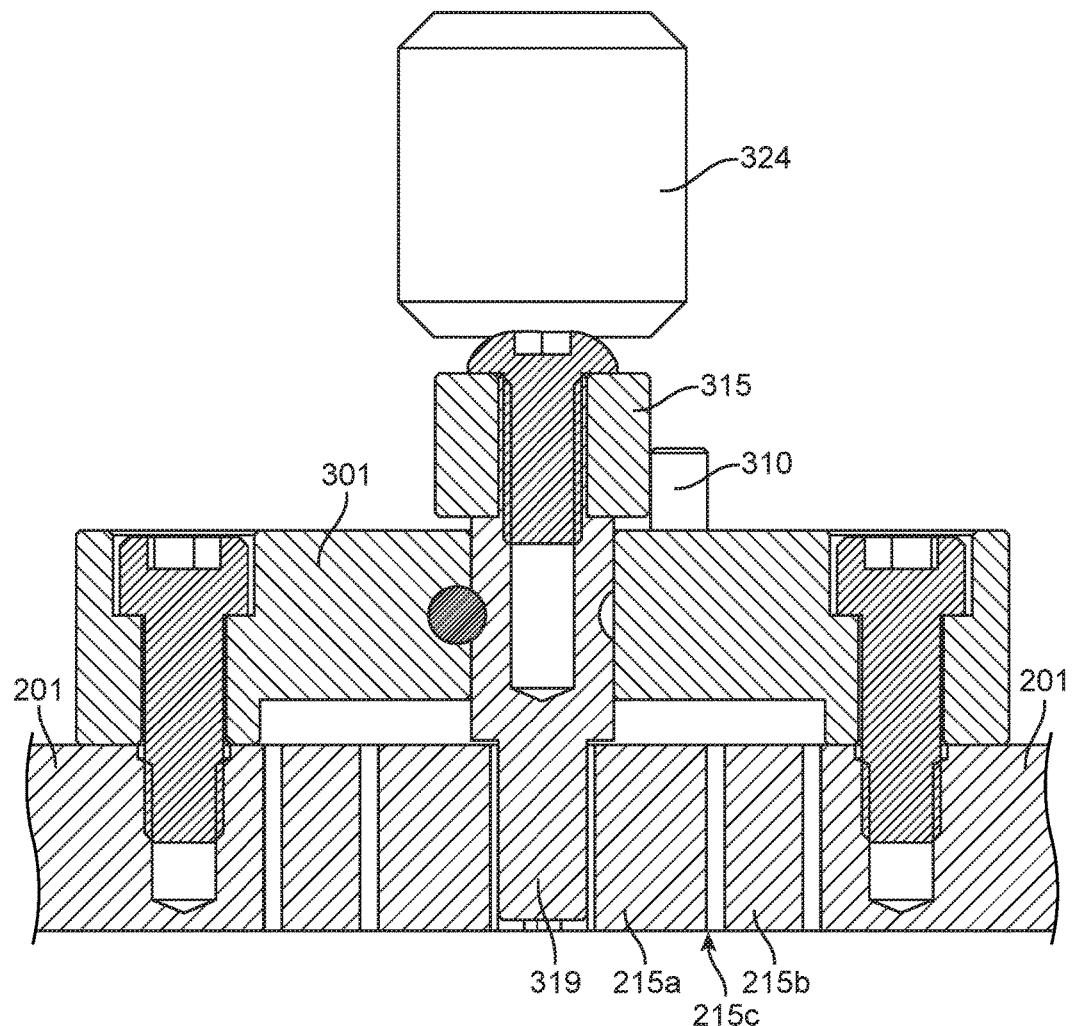
FIG. 12 is a cross section view of the portion of the fixture shown in FIG. 9 taken along the lines 12-12 in FIG. 9.
Figure 13:
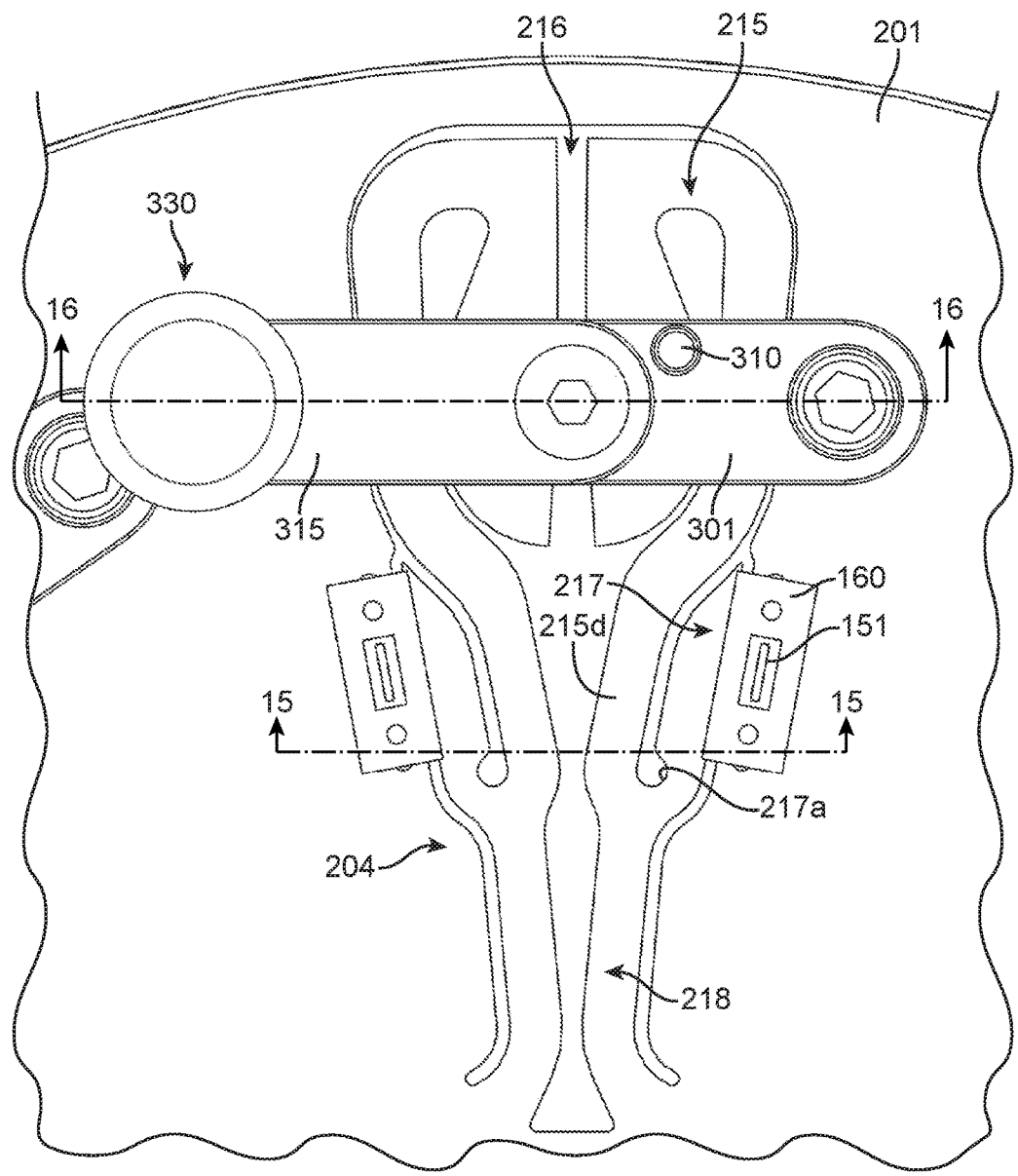
FIG. 13 is a top view of a portion of the fixture shown in FIG. 4 showing a locked position.
Figure 16:
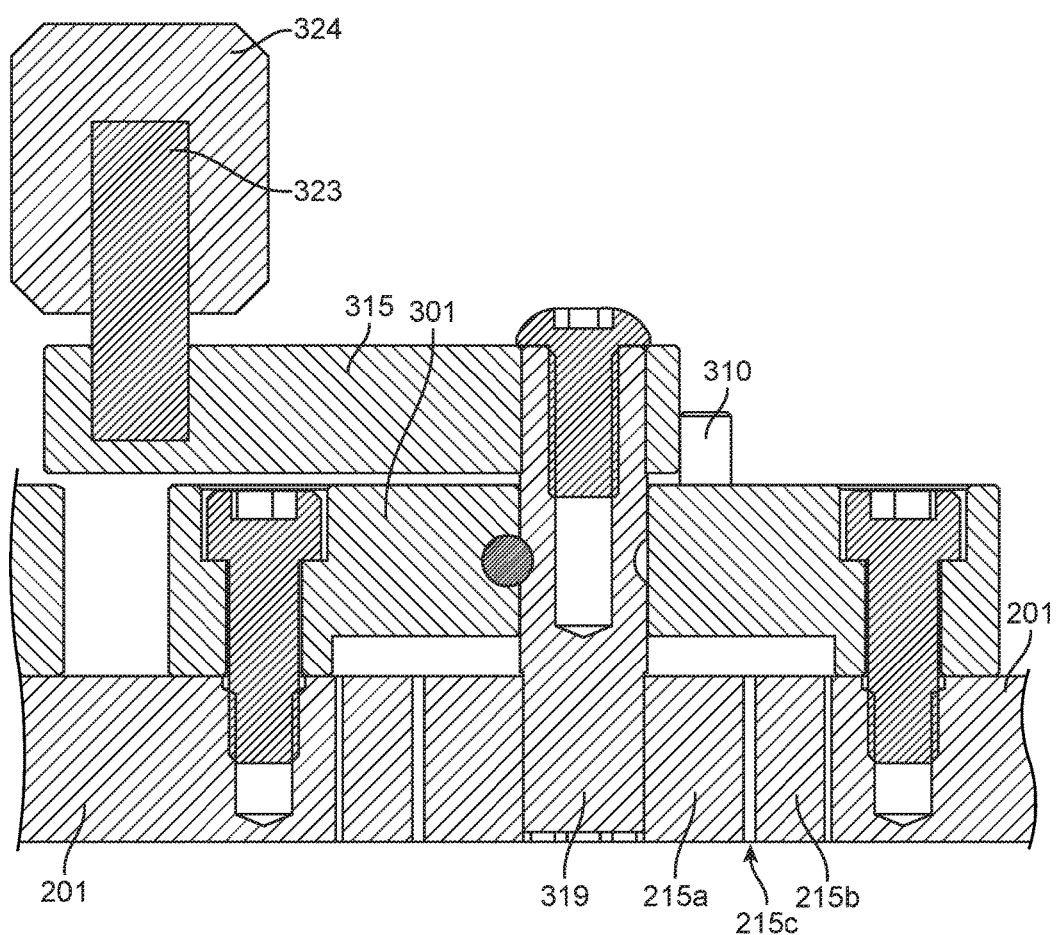
FIG. 16 is a cross section view of the portion of the fixture shown in FIG. 13 taken along the lines 16-16 in FIG. 13.

The clamping assembly 300 is shown in FIG. 8. The clamping assembly 300 includes a base 301 with a first end 302 through which a first bore 303 extends, a second end 305 through which a bore 306 extends, and a middle portion 308 through which a bore (not shown) extends. A fastener 304 extends through the bore 303 and a fastener 307 extends through the bore 306 to connect the base 301 to the fixture base 201. In the orientation shown in FIG. 8, a first stop 310 extends upward proximate a top right of the middle bore and a second stop 311 extends upward proximate a bottom right of the bore 306. A lever 315 is pivotally connected to the base 301. The lever 315 has a first end 316 with a bore (not shown) that is aligned with the middle bore of the base 301. A cam shaft 319 is positioned in the middle bore of the base 301 and extends downward from the base 301. A fastener 318 extends through the bore of the lever's first end 316 and into the cam shaft 319. This is shown in FIGS. 12 and 16. The lever 315 pivots about the fastener 318 and causes the cam shaft 319 to rotate. The cam shaft 319 has a cross section that is generally oval-shaped with a narrower side 320 with opposing sides 320a and 320b and a wider side 321 with opposing sides 321a and 321b. A second end of the lever 315 includes an extension 323 extending upward therefrom and a knob is connected to the extension 323. An intermediate portion of the lever includes a stop receiver 326, which is a notched portion configured and arranged to receive the second stop 311 when the lever 315 is positioned in a locked position 330, as shown in FIG. 8. When the lever 315 is positioned in an unlocked position 329, as shown in FIG. 9, the first end 316 of the lever 315 contacts the first stop 310. The stops 310 and 311 assist in positioning the lever 315 in the unlocked position 329 and the locked position 330.

Figure 10:
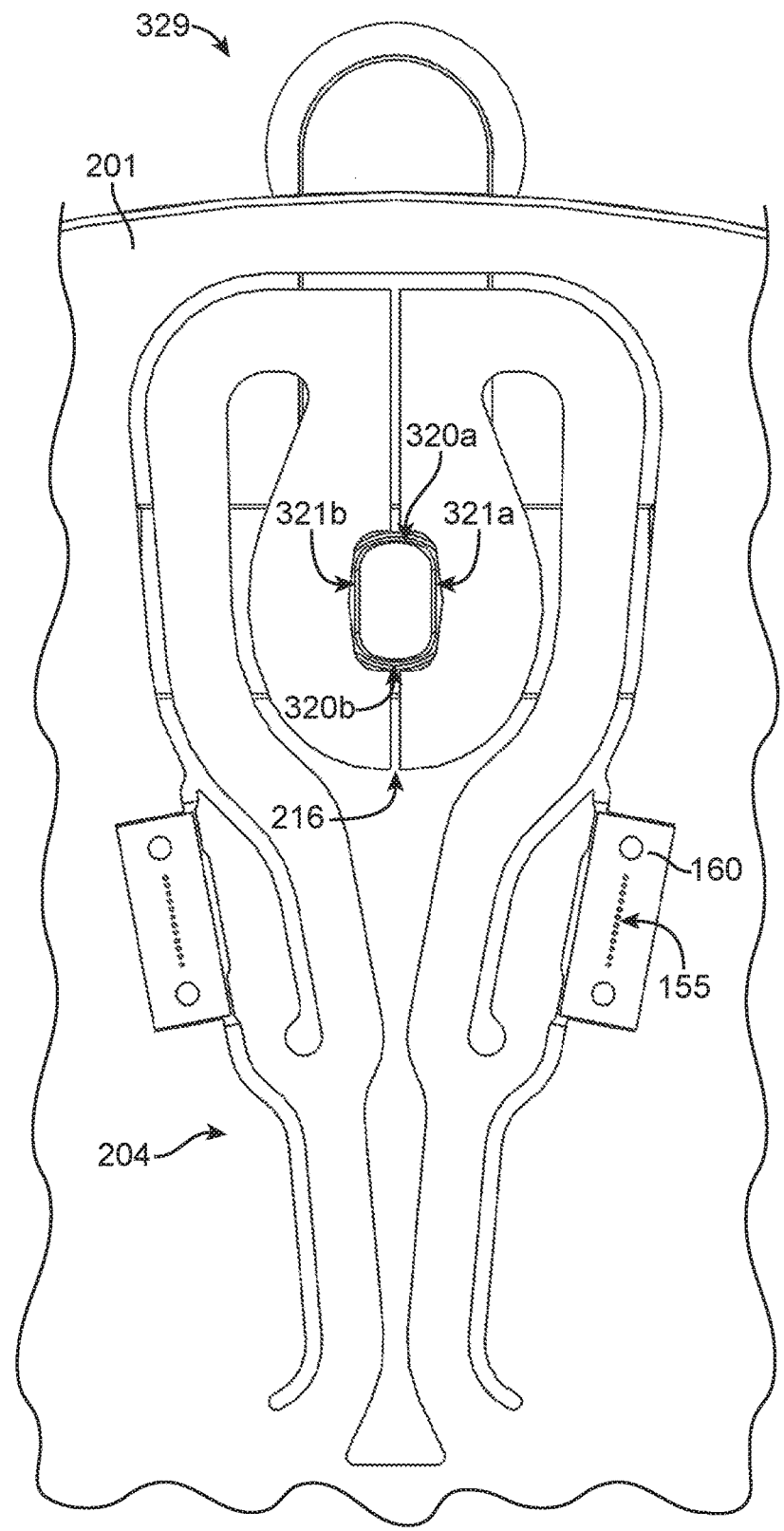
FIG. 10 is a bottom view of the portion of the fixture shown in FIG. 9.
Figure 11:
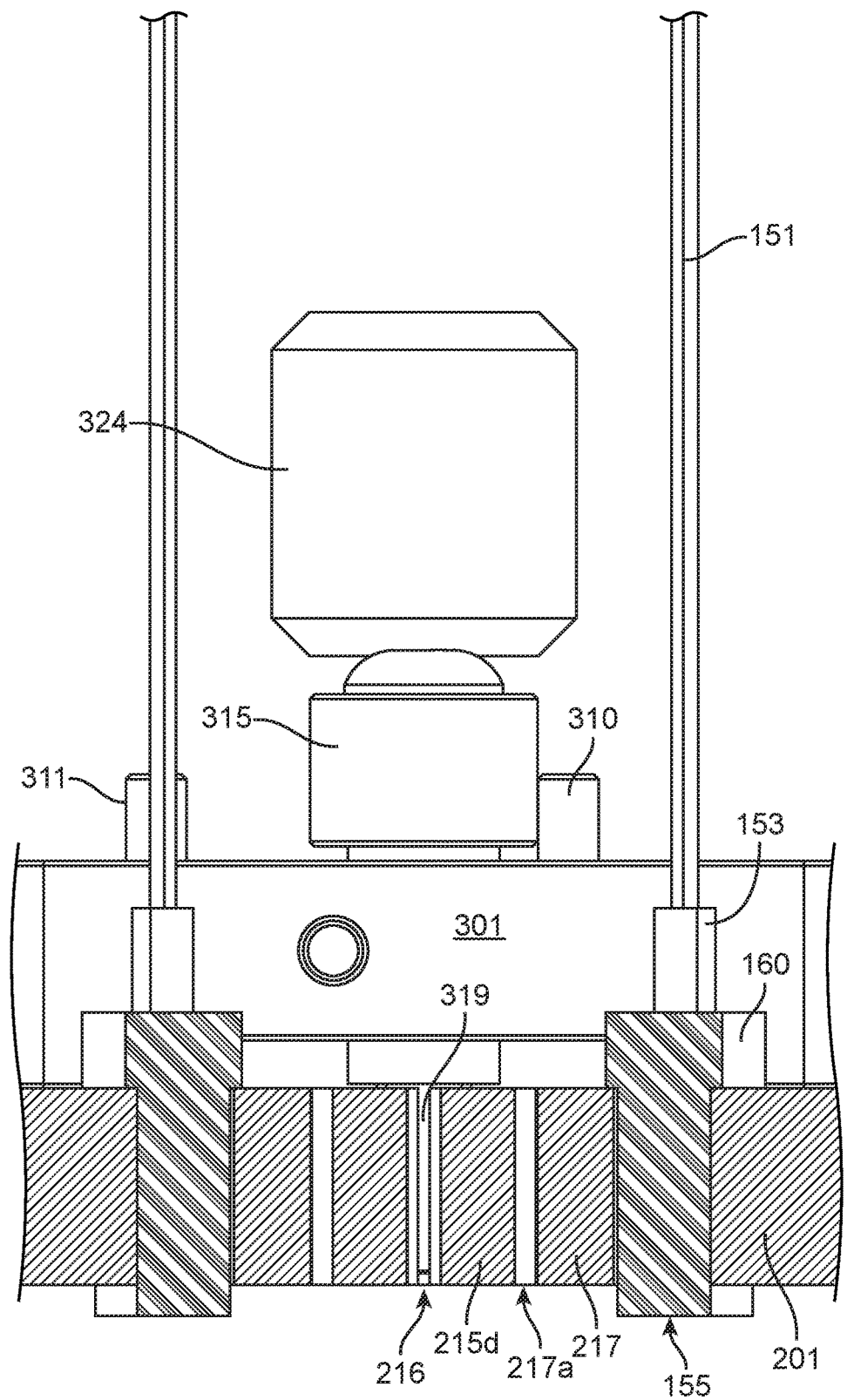
FIG. 11 is a cross section view of the portion of the fixture shown in FIG. 9 taken along the lines 11-11 in FIG. 9.
Figure 14:
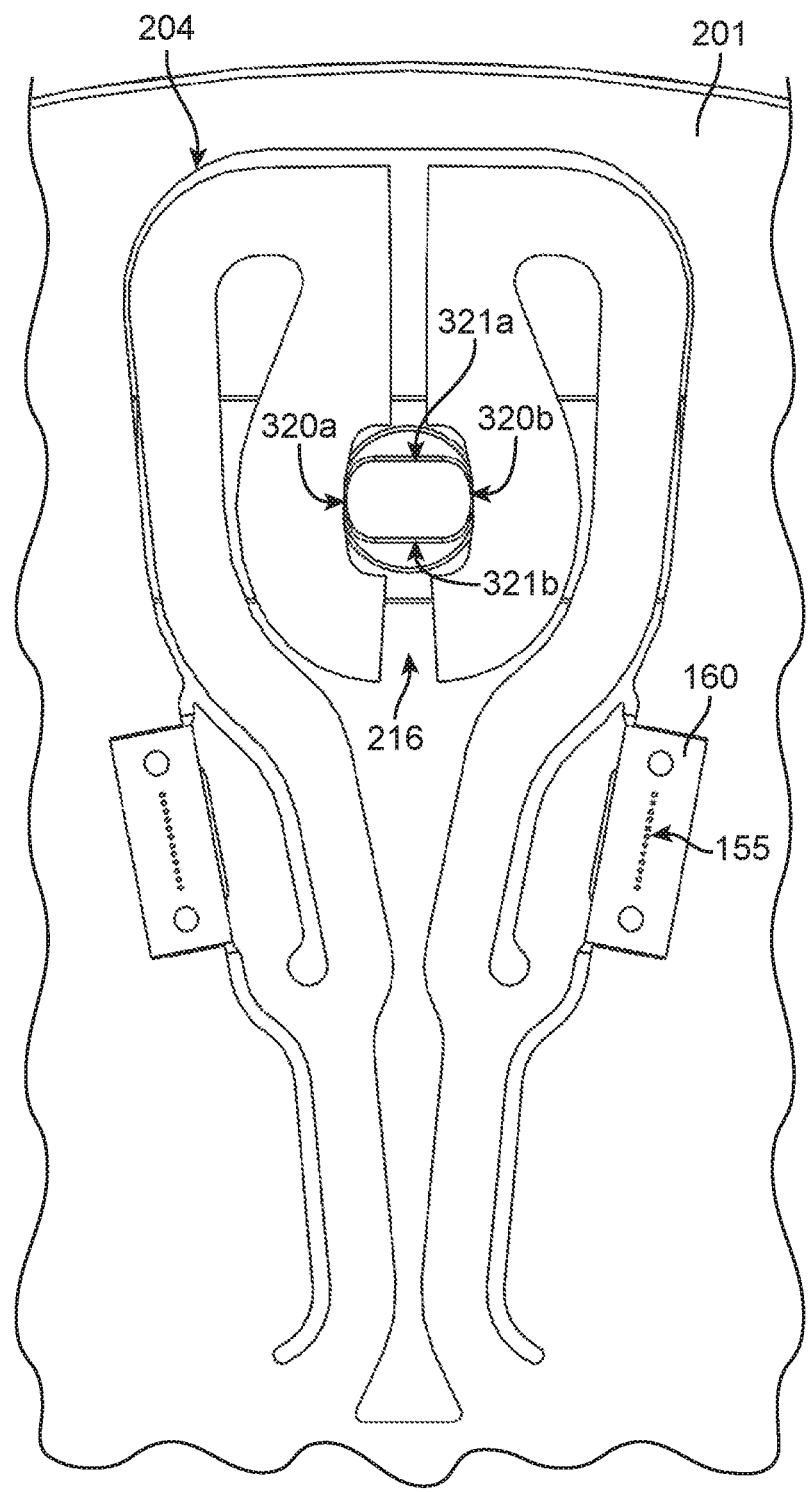
FIG. 14 is a bottom view of the portion of the fixture shown in FIG. 13.
Figure 15:
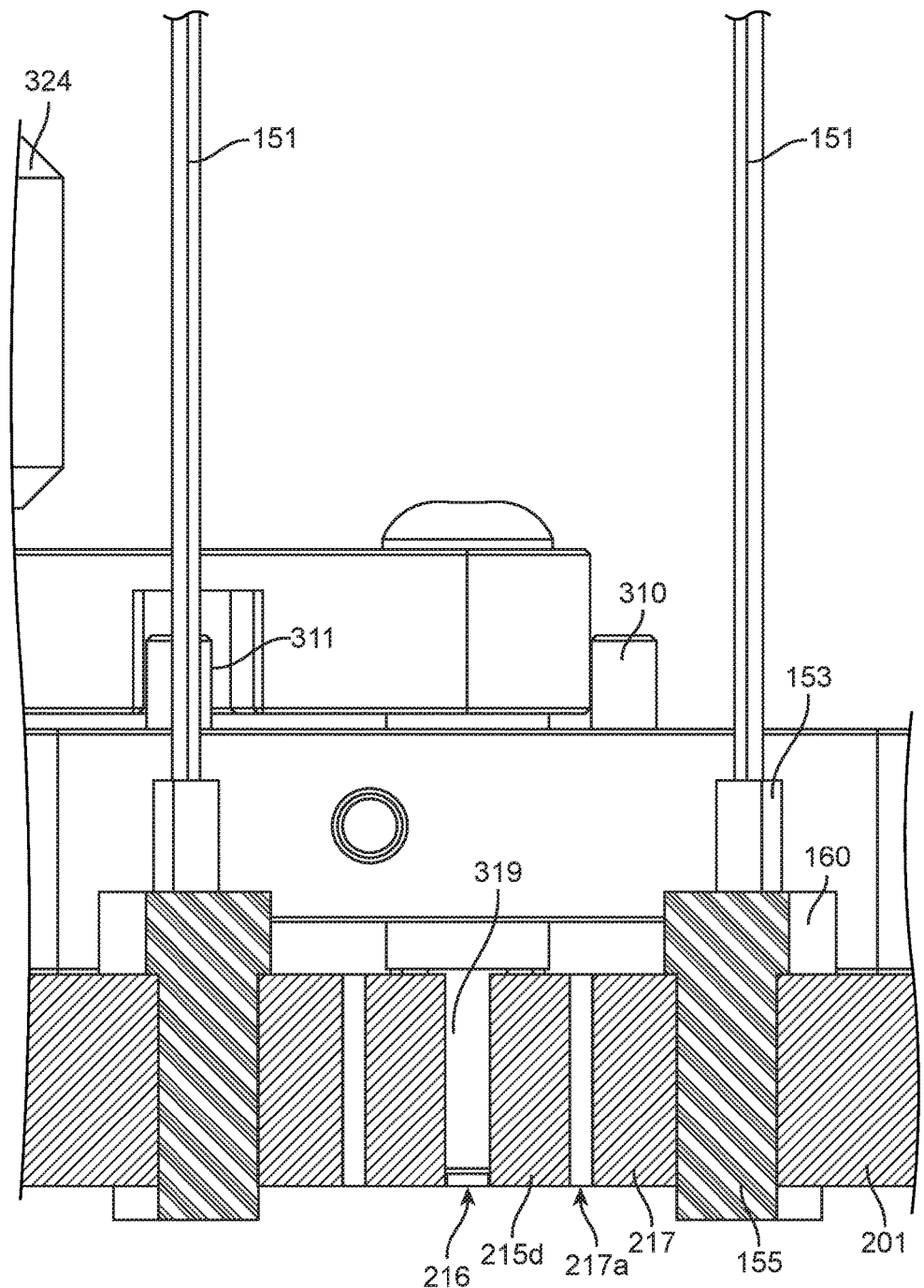
FIG. 15 is a cross section view of the portion of the fixture shown in FIG. 13 taken along the lines 15-15 in FIG. 13.

In operation, the lever 315 is positioned in the unlocked position 329 so that the cam shaft 319 extends longitudinally within the cam aperture 207 as shown in FIG. 10, a ferrule 155 is positioned in one or both of the ferrule apertures 221. Then, the lever 315 is pivoted about the fastener 318 from the unlocked position 329 into the locked position 330 thereby rotating the cam shaft 319 so that the cam shaft 319 extends laterally within the cam aperture 207 as shown in FIG. 14. Because the wider side 321 is longer than the width of the cam aperture 207, the cam shaft 319 contacts the upper springs 215 and moves them further apart, widening the slot 216. The movement of the upper springs 215 causes movement of the middle springs 217 and the lower springs 218.

The spring member 214 and the clamping assembly 300 have a three spring action clamping mechanism for each ferrule it is holding. The three spring action clamping mechanism is actuated by the lever 315 connected to the cam shaft 319 with two flats (wider sides 321a and 321b) on the side of it called an eccentric pin, positioned in a cam aperture 207 having two off center radii. When the lever 315 is in the unlocked position 329, the flats (wider sides 321a and 321b) on the eccentric pin are facing the off center radii of the cam aperture 207 and they are not contacting the upper springs 215. As the cam shaft 319 is rotated, the eccentric pin diameter (narrower sides 320a and 320b) contacts the off center radii of the cam aperture 207 (upper springs 215), which moves the upper springs 215 away from one another, flexes the lower springs 218, and flexes the middle springs 217 to conform both ends of the clamp face 220 to the ferrule 155. When the ferrules 155 are fully clamped, the upper springs 215 flex to take up the rest of the unneeded clamping force until the cam shaft 319 is 90° from the starting position and fully engaged. The upper springs 215 allow for adjustment to the ferrules' size tolerance. The extra movement of the upper springs 215 and the general pivoting movement of the middle springs 217 allow the clamping faces 220 of the middle springs 217 to conform to the non-round ferrules. If the ferrules size is at the low end of its tolerance, the lower spring 218 will flex more so that the clamp face 220 of the middle spring 217 contacts the ferrule initially and the upper spring 215 will flex less. If the ferrules size is at the high end of its tolerance, the clamp face 220 of the middle spring 217 will contact the ferrule earlier and the upper spring 215 will have to flex more to take up the rest of the force applied by the rotating cam shaft 319. This allows the spring member 214 and the clamping assembly 300 to hold a size range tolerance up to 0.005 inches (0.127 mm).

The spring member cut 214 and the clamping assembly 300 are configured and arranged to clamp non-round ferrule assemblies (e.g., cable assemblies having rectangular ferrules) to fixtures 200. There is no need for a torque wrench or other tools to tighten the assembly.

The above specification, examples, and data provide a complete description of the manufacture and use of the composition of embodiments of the invention. Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the invention. Therefore, it is manifestly intended that this invention be limited only by the claims and the equivalents thereof.

The invention claimed is:

1. An optical fiber polishing fixture assembly, comprising:
    a fixture base having a ferrule aperture and a spring member, the spring member comprising an upper spring, a middle spring, and a lower spring, the upper spring forming at least a portion of a cam aperture, the middle spring being positioned proximate the ferrule aperture;
    a clamping assembly having a clamp base, a lever, and a cam shaft, the clamp base being configured and arranged to be operatively connected to the fixture base, the lever being pivotally connected to the clamp base and having an unlocked position and a locked position, and the cam shaft being operatively connected to the lever, the cam shaft rotating when the lever pivots, the cam shaft having opposing narrower sides and opposing wider sides, the cam shaft being positioned within the cam aperture; and
    wherein as the lever is moved from the unlocked position to the locked position, the cam shaft rotates, the opposing narrower sides contact the upper spring thereby flexing the middle spring and the lower spring so that the middle spring contacts a ferrule positioned in the ferrule aperture, wherein movement of the spring member allows for variation in ferrule size and protects the ferrule while clamping so that clamping of the ferrule does not damage the ferrule or optical fibers extending through the ferrule.

2. The optical fiber polishing fixture assembly of claim 1, wherein the upper spring comprises a first upper spring and a second upper spring, the middle spring comprises a first middle spring and a second middle spring, and the lower spring comprises a first lower spring and a second lower spring, the first springs being operatively connected and the second springs being operatively connected, the first and second upper springs forming the cam aperture.

3. The optical fiber polishing fixture assembly of claim 1, wherein the upper spring, the middle spring, and the lower spring are integral and in the same plane as the fixture base.

4. The optical fiber polishing fixture assembly of claim 1, wherein the spring member is formed by a cut pattern in the fixture base and integral with the fixture base.

5. The optical fiber polishing fixture assembly of claim 1, wherein the lower spring extends downward from the upper spring and the middle spring forming a Y-shaped portion where they connect.

6. The optical fiber polishing fixture assembly of claim 1, wherein the upper spring has a first portion that extends around a portion of the cam aperture and extends generally upward therefrom, a second portion that extends generally downward from the first portion, and a third portion that extends generally downward from the second portion proximate the first portion and is connected to the middle spring and the lower spring, the middle spring extends generally upward from the third portion and the lower spring extends generally downward from the third portion, a first lobe is positioned proximate a juncture of the first portion and the second portion, and a second lobe is positioned proximate a juncture of the third portion and the middle spring.

7. The optical fiber polishing fixture assembly of claim 6, wherein the first portion from which the second portion extends downward has a first thickness of 0.100+/−0.004 inch, the second portion has a second thickness of 0.085+/−0.004 inch proximate a lower portion of the cam aperture, the middle spring has a third thickness of 0.50+/−0.004 inch proximate the second lobe, the lower spring has a fourth thickness of 0.075+/−0.004 inch proximate its middle, and opposing ends of the lower spring form an angle of approximately 40°.

8. The optical fiber polishing fixture assembly of claim 6, wherein the first portion from which the second portion extends downward has a first thickness, the second portion has a second thickness of 80 to 90% of the first thickness proximate a lower portion of the cam aperture, the middle spring has a third thickness of 40 to 60% of the first thickness proximate the second lobe, the lower spring has a fourth thickness of 70 to 80% of the first thickness proximate its middle, and opposing ends of the lower spring form an angle of approximately 40°.

9. The optical fiber polishing fixture assembly of claim 1, wherein the fixture base is made of hardened stainless steel and has a thickness allowing the ferrule to protrude 0.020 to 0.040 inches from a bottom of the fixture base.

10. The optical fiber polishing fixture assembly of claim 1, wherein when the lever is moved from the unlocked position to the locked position and the ferrule is being clamped, the upper spring flexes to take up any unneeded clamping force while the cam shaft is being rotated, movement of the upper spring and the middle spring allows a clamping face of the middle spring to conform to the ferrule, if the ferrule size is at a lower end of its tolerance, the lower spring will flex more so that the clamp face of the middle spring contacts the ferrule initially and the upper spring will flex less, if the ferrules size is at a higher end of its tolerance, the clamp face of the middle spring will contact the ferrule earlier and the upper spring will have to flex more to take up any force applied by the rotating cam shaft.

11. An optical fiber polishing fixture assembly, comprising:
a fixture base having a ferrule aperture and a spring member, the spring member comprising an upper spring, a middle spring, and a lower spring, the upper spring forming at least a portion of a cam aperture, the upper spring having a first portion that extends around a portion of the cam aperture and extends generally upward therefrom, a second portion that extends generally downward from the first portion, and a third portion that extends generally downward from the second portion proximate the first portion and is connected to the middle spring and the lower spring, the middle spring being positioned proximate the ferrule aperture, the middle spring extending generally upward from the third portion and the lower spring extending generally downward from the third portion, a first lobe being positioned proximate a juncture of the first portion and the second portion, and a second lobe being positioned proximate a juncture of the third portion and the middle spring;
a clamping assembly having a clamp base, a lever, and a cam shaft, the clamp base being configured and arranged to be operatively connected to the fixture base, the lever being pivotally connected to the clamp base and having an unlocked position and a locked position, and the cam shaft being operatively connected to the lever, the cam shaft rotating when the lever pivots, the cam shaft having opposing narrower sides and opposing wider sides, the cam shaft being positioned within the cam aperture; and
wherein as the lever is moved from the unlocked position to the locked position, the cam shaft rotates, the opposing narrower sides contact the upper spring thereby flexing the middle spring and the lower spring so that the middle spring contacts a ferrule positioned in the ferrule aperture, wherein movement of the spring member allows for variation in ferrule size and protects the ferrule while clamping so that clamping of the ferrule does not damage the ferrule or optical fibers extending through the ferrule.

12. The optical fiber polishing fixture assembly of claim 11, wherein the upper spring comprises a first upper spring and a second upper spring, the middle spring comprises a first middle spring and a second middle spring, and the lower spring comprises a first lower spring and a second lower spring, the first springs being operatively connected and the second springs being operatively connected, the first and second upper springs forming the cam aperture.

13. The optical fiber polishing fixture assembly of claim 11, wherein the upper spring, the middle spring, and the lower spring are integral and in the same plane as the fixture base.

14. The optical fiber polishing fixture assembly of claim 11, wherein the spring member is formed by a cut pattern in the fixture base and integral with the fixture base.

15. The optical fiber polishing fixture assembly of claim 11, wherein the lower spring extends downward from the upper spring and the middle spring forming a Y-shaped portion where they connect.

16. The optical fiber polishing fixture assembly of claim 11, wherein the first portion from which the second portion extends downward has a first thickness of 0.100+/−0.004 inch, the second portion has a second thickness of 0.085+/−0.004 inch proximate a lower portion of the cam aperture, the middle spring has a third thickness of 0.50+/−0.004 inch proximate the second lobe, the lower spring has a fourth thickness of 0.075+/−0.004 inch proximate its middle, and opposing ends of the lower spring form an angle of approximately 40°.

17. The optical fiber polishing fixture assembly of claim 11, wherein the first portion from which the second portion extends downward has a first thickness, the second portion has a second thickness of 80 to 90% of the first thickness proximate a lower portion of the cam aperture, the middle spring has a third thickness of 40 to 60% of the first thickness proximate the second lobe, the lower spring has a fourth thickness of 70 to 80% of the first thickness proximate its middle, and opposing ends of the lower spring form an angle of approximately 40°.

18. The optical fiber polishing fixture assembly of claim 11, wherein the fixture base is made of hardened stainless steel and has a thickness allowing the ferrule to protrude 0.020 to 0.040 inches from a bottom of the fixture base.

19. The optical fiber polishing fixture assembly of claim 11, wherein when the lever is moved from the unlocked position to the locked position and the ferrule is being clamped, the upper spring flexes to take up any unneeded clamping force while the cam shaft is being rotated, movement of the upper spring and the middle spring allows a clamping face of the middle spring to conform to the ferrule, if the ferrule size is at a lower end of its tolerance, the lower spring will flex more so that the clamp face of the middle spring contacts the ferrule initially and the upper spring will flex less, if the ferrules size is at a higher end of its tolerance, the clamp face of the middle spring will contact the ferrule earlier and the upper spring will have to flex more to take up any force applied by the rotating cam shaft.

\* \* \* \* \*